US011744172B2

United States Patent
Noll et al.

(10) Patent No.: US 11,744,172 B2
(45) Date of Patent: Sep. 5, 2023

(54) ADJUSTABLE INFEED DECK COVER

(71) Applicant: CNH Industrial America LLC, New Holland, PA (US)

(72) Inventors: Blaine R. Noll, Fleetwood, PA (US); Jeffrey D. Thomas, Gordonville, PA (US); Benjamin Kemmerer, Hamburg, PA (US)

(73) Assignee: CNH Industrial America LLC, New Holland, PA (US)

( * ) Notice: Subject to any disclaimer, the term of this patent is extended or adjusted under 35 U.S.C. 154(b) by 792 days.

(21) Appl. No.: 16/838,331

(22) Filed: Apr. 2, 2020

(65) Prior Publication Data
US 2020/0315086 A1 Oct. 8, 2020

Related U.S. Application Data

(60) Provisional application No. 62/828,075, filed on Apr. 2, 2019.

(51) Int. Cl.
*A01D 34/00* (2006.01)

(52) U.S. Cl.
CPC .................. *A01D 34/003* (2013.01)

(58) Field of Classification Search
CPC .. A01D 34/003; A01D 41/14; A01D 41/1252; A01D 75/187; A01D 75/18; A01D 75/00; A01D 61/00; A01F 12/16
See application file for complete search history.

(56) References Cited

U.S. PATENT DOCUMENTS

| 5,489,239 | A | * | 2/1996 | Matousek | A01F 12/28 460/109 |
| 5,867,971 | A | | 2/1999 | Kaupp | |
| 7,011,580 | B2 | | 3/2006 | Claeys et al. | |
| 8,858,310 | B2 | * | 10/2014 | Cooksey | A01F 12/46 460/103 |
| 9,288,944 | B2 | | 3/2016 | Coppinger et al. | |
| 10,045,487 | B1 | * | 8/2018 | Robertson | A01F 7/067 |
| 10,405,492 | B2 | * | 9/2019 | Ricketts | A01F 12/16 |
| 2006/0128452 | A1 | * | 6/2006 | Esken | A01F 12/28 460/79 |
| 2018/0359924 | A1 | * | 12/2018 | Ricketts | A01F 12/10 |
| 2020/0253124 | A1 | * | 8/2020 | Honey | A01D 61/008 |
| 2020/0253126 | A1 | * | 8/2020 | Robertson | A01F 12/28 |

FOREIGN PATENT DOCUMENTS

JP 08266136 A 10/1996

\* cited by examiner

*Primary Examiner* — Abigail A Risic
(74) *Attorney, Agent, or Firm* — Peter Zacharias

(57) ABSTRACT

A clean out system of a header for an agricultural vehicle including at least one cover having a plurality of perforations and at least one actuating member connected to the at least one cover. The at least one actuating member is configured for moving the at least one cover between a first position to completely cover at least one cutout of the frame of the header for blocking the unwanted material from exiting the header, a second position to at least partially uncover the at least one cutout for permitting the unwanted material to pass through the at least one cutout, and a third position to align at least one perforation of the plurality of perforations with the at least one cutout for permitting the unwanted material to pass through the at least one cutout and the at least one perforation of the plurality of perforations.

20 Claims, 6 Drawing Sheets

ADJUSTABLE INFEED DECK COVER

BACKGROUND OF THE INVENTION

The present invention pertains to headers and, more specifically, to an infeed cover of an infeed deck of a header.

A typical header generally includes an infeed frame, a pair of end dividers at the lateral ends of the infeed frame, a floor such as a deck, a cutter to remove crop material from the field, and a conveyor to transport the cut crop material to the feeder housing for further downstream processing in the combine. Generally, the components of a header are specifically optimized to harvest a particular kind of crop. For instance, the header may be in the form of a draper header which has a cutter bar, a draper belt, and a rotating reel with tines or the like in order to harvest a bushy or fluffy crop, such as soy beans or canola. Alternatively, the header may be in the form of a corn header which includes an auger and row units with snouts, gathering chains, and stalk rolls in order to harvest corn.

During operation of the header, the bottom floor or deck of the header may collect dust and debris as the crop material is transported from the header into the agricultural vehicle. Thereby, to clean out the infeed deck and allow unwanted material to exit the infeed deck, a header may additionally include one or more cutouts and covers or hinged doors that selectively coverup the cutouts. The cleanout doors can be connected to the underside of the infeed deck, for example, by bolts, latches, and/or hinges. Generally, an operator must crawl underneath the header to remove each cleanout door. As can be appreciated, crawling under the header in order to clean out the infeed deck may be cumbersome and time-consuming. Additionally or alternatively, the covers or hinged doors may be perforated to allow the dust and other debris to pass through the perforations. A solid cover may need to be interchanged with a perforated cover, or vice versa, depending on the crop type or operating conditions, and thereby the operator must generally purchase and store both solid and perforated covers.

What is needed in the art is a cost-effective and easy-to-use infeed cover that can accommodate a greater range of operating conditions.

SUMMARY OF THE INVENTION

In one exemplary embodiment formed in accordance with the present invention, there is provided a header which generally includes a frame having a floor with at least one cutout and at least one cover that is movably attached to the floor. The cover may have through-holes or perforations on one side to allow unwanted material to pass through the perforations. The cover may slide between various positions, relative to the floor, such that the cover may completely cover the cutout, at least partially uncover the cutout, and allow unwanted material to pass through the cutout and at least one of the perforations.

In another exemplary embodiment formed in accordance with the present invention, there is provided a clean out system of a header for an agricultural vehicle. The header includes a frame with a floor having at least one cutout for allowing an unwanted material to pass therethrough. The clean out system includes at least one cover configured for movably connecting to the floor and comprising a plurality of perforations and at least one actuating member connected to the at least one cover. The at least one actuating member is configured for moving the at least one cover between a first position to completely cover the at least one cutout for blocking the unwanted material from exiting the header, a second position to at least partially uncover the at least one cutout for permitting the unwanted material to pass through the at least one cutout, and a third position to align at least one perforation of the plurality of perforations with the at least one cutout for permitting the unwanted material to pass through the at least one cutout and the at least one perforation of the plurality of perforations.

In yet another exemplary embodiment formed in accordance with the present invention, there is provided a header for an agricultural vehicle. The header includes a frame with a floor having at least one cutout for allowing an unwanted material to pass therethrough. The header also includes a clean out system connected to the floor of the frame. The clean out system includes at least one cover movably connected to the floor and having a plurality of perforations and at least one actuating member supported by the frame and connected to the at least one cover. The at least one actuating member is configured for moving the at least one cover between a first position to completely cover the at least one cutout for blocking the unwanted material from exiting the header, a second position to at least partially uncover the at least one cutout for permitting the unwanted material to pass through the at least one cutout, and a third position to align at least one perforation of the plurality of perforations with the at least one cutout for permitting the unwanted material to pass through the at least one cutout and the at least one perforation of the plurality of perforations.

In yet another exemplary embodiment formed in accordance with the present invention, there is provided a method for cleaning a header for an agricultural vehicle. The header includes a frame with a floor having at least one cutout for allowing an unwanted material to pass therethrough. The method includes the step of providing a clean out system including at least one cover configured for moveably connecting to the floor and having a plurality of perforations and at least one actuating member connected to the at least one cover. The at least one actuating member is configured for moving the at least one cover. The method includes the further step of moving the at least one cover, by the at least one actuating member, into a first position to completely cover the at least one cutout for blocking the unwanted material from exiting the header. The method includes the further step of moving the at least one cover, by the at least one actuating member, into a second position to at least partially uncover the at least one cutout for permitting the unwanted material to pass through the at least one cutout. The method includes the further step of moving the at least one cover, by the at least one actuating member, into a third position to align at least one perforation of the plurality of perforations with the at least one cutout for permitting the unwanted material to pass through the at least one cutout and the at least one perforation of the plurality of perforations.

One possible advantage of the exemplary embodiment of the moving cover and actuating member of the header is that an operator may easily and efficiently change the position of the cover without interchanging separate covers or crawling underneath the header to manually reposition the cover.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

The terms "forward", "rearward", "left" and "right", when used in connection with the agricultural vehicle and/or components thereof are usually determined with reference to the direction of forward operative travel of the agricultural vehicle, but again, they should not be construed as limiting. The terms "longitudinal" and "transverse" are determined with reference to the fore-and-aft direction of the agricultural vehicle and are equally not to be construed as limiting.

Figure 1:
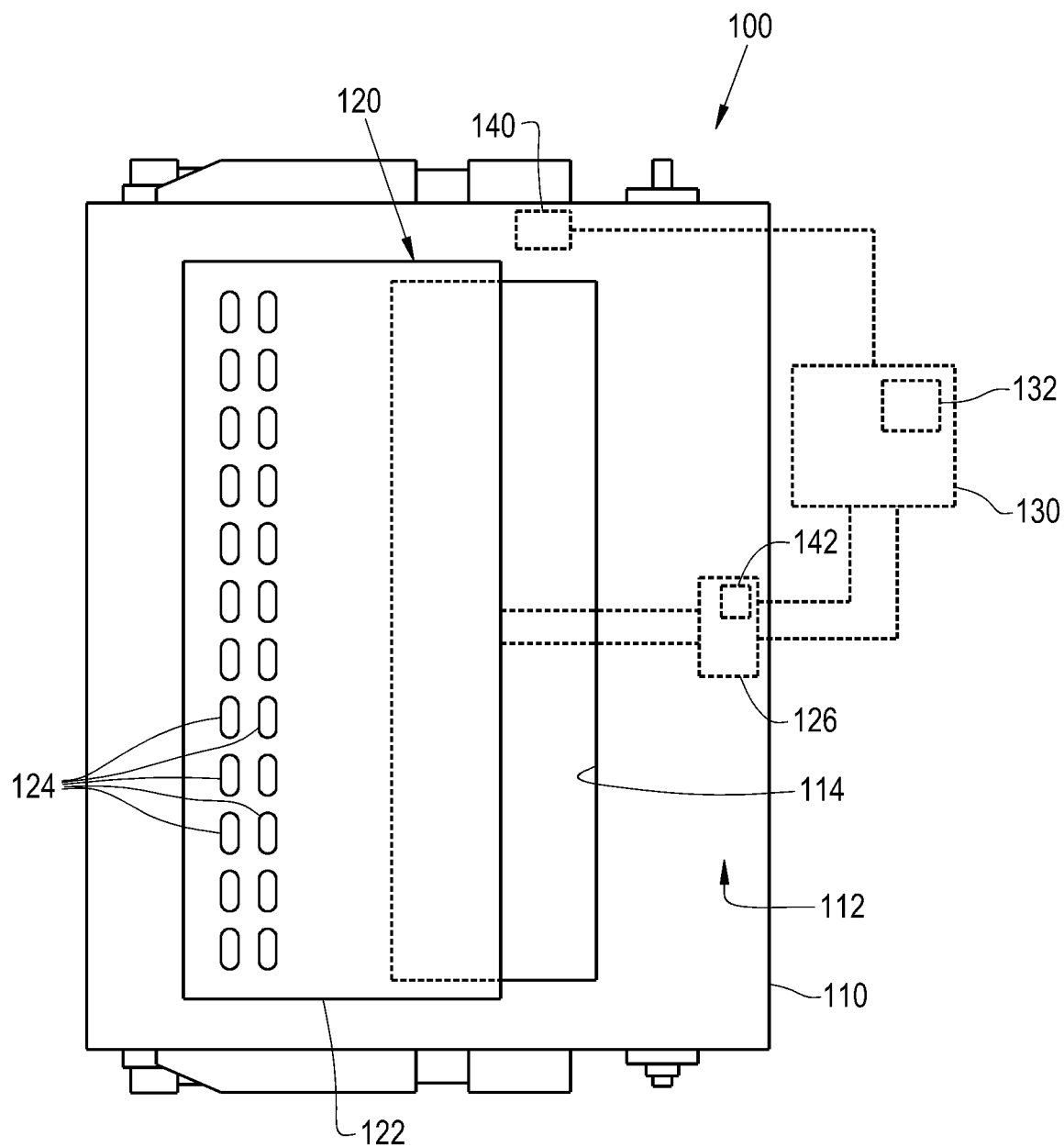
FIG. 1 illustrates a bottom view of an exemplary embodiment of a header having an infeed deck, at least one cutout, and at least one cover in an open or cleanout position, in accordance with an exemplary embodiment of the present invention.
Figure 2:
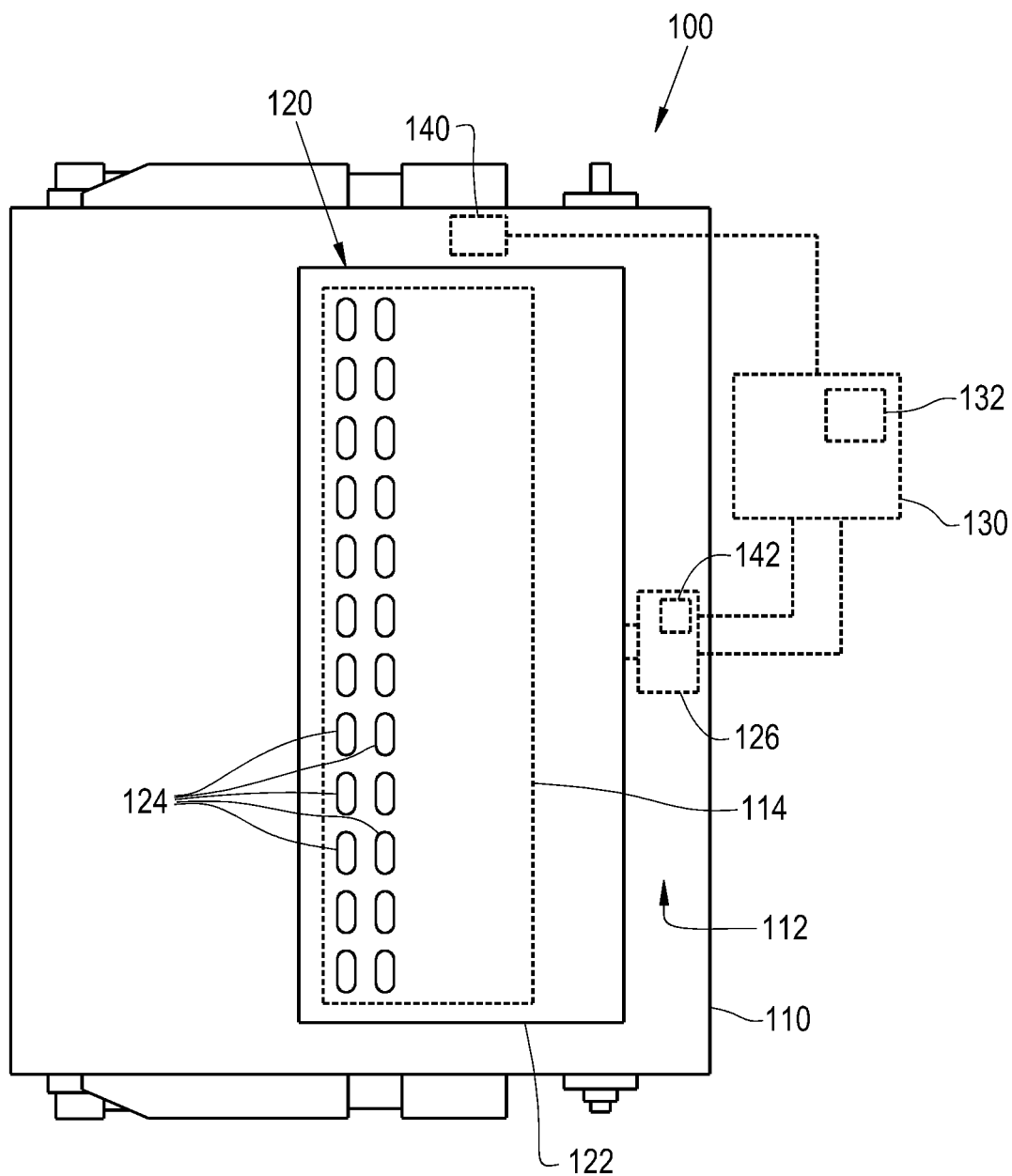
FIG. 2 illustrates another bottom view of the header of FIG. 1 with the at least one cover in a perforated position, in accordance with an exemplary embodiment of the present invention.
Figure 3:
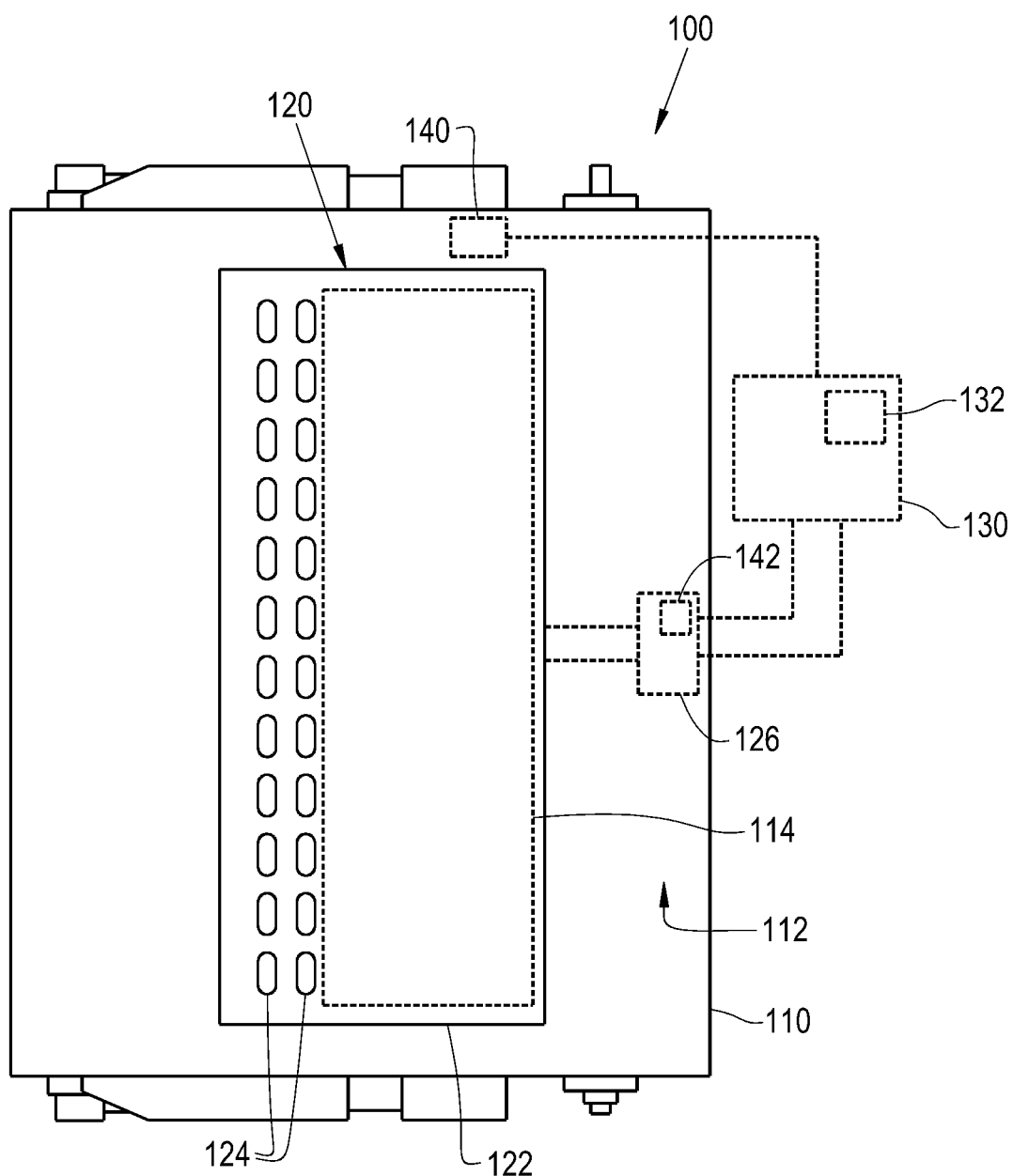
FIG. 3 illustrates another bottom view of the header of FIGS. 1-2 with the at least one cover in a closed position, in accordance with an exemplary embodiment of the present invention.

Referring now to the drawings, and more particularly to FIGS. 1-3, there is shown an exemplary embodiment of a header 100 which generally includes a frame 110, with a floor 112 and a cutout 114, and a clean out system 120 connected to the floor 112 of the frame 110. The clean out system 120 includes at least one cover 122 with perforations 124 and at least one actuating member 126. Each actuating member 126 may move a corresponding cover 122 in between a cleanout position (FIG. 1), a perforated position (FIG. 2), and a closed position (FIG. 3).

As used herein, the cleanout position may refer to a position in which the cover 122 at least partially uncovers the cutout 114 for permitting the unwanted material to pass through the cutout 114. The perforated position may refer to a position in which at least one of the perforations 124 is aligned with a portion of the cutout 114, which permits the unwanted material, such as fine material, to pass through the cutout 114 and the perforation(s) 124. The closed position may refer to a position in which the cover 122 completely covers or blocks the cutout 114 to prevent the any material from exiting the header 100. It should be appreciated that the cover 122 may include numerous positions in order to partially or completely cover or uncover the cutout 114. The cover 122 may be positioned in any position during a field-working operation or maintenance operation.

The header 100 or agricultural vehicle may also include an electronic control unit 130, and one or more sensors, such as a pair of sensors 140, 142. The header 100 may further include a pair of end dividers, a cutter to remove the crop material from the field, and a conveyor to transport the cut crop material to the feeder housing for further downstream processing in the agricultural vehicle. The header 100 may be in the form of any desired header, such as a draper header or a corn header. For instance, if the header 100 is in the form of a draper header, the header 100 may further include a cutter bar, a draper belt, and a rotating reel with tines (not shown). The header 100 may be removably connected to the chassis of an agricultural vehicle. The agricultural vehicle may be in the form of any desired agricultural vehicle, such as a combine or self-propelled windrower.

The frame 110 of the header 100 may be in the form of a main frame of the header or an infeed frame which is connected to the main frame of the header 100. As shown, the frame 110 is in the form of an infeed frame 110. The infeed frame 110 of the header 100 may include a front end and a rear end and a floor 112, such as an infeed deck 112. As can be appreciated, material may build up in the header 100, for example in between the draper belt and the infeed frame 110, which may cause additional wear on the infeed frame or lower the crop yield. The cutout 114 in the infeed deck 112 allows such material, for example unwanted material in the form of dust, debris, crop material, etc., to exit the floor 112 of the header 100. As shown, the infeed frame 110 only includes a single cutout 114 in the floor 112; however, the infeed frame 110 may include two, three, four or more cutouts 114 in the floor 112. Accordingly, each cutout 114 may be paired with a respective cover 122, or multiple cutouts 114 may be paired with a single, corresponding cover 122. The infeed frame 110 may be comprised of any desired material.

Each cover 122 can be detachably and/or moveably connected to the infeed frame 110. For example, each cover 122 may be slideably connected to the floor 112 of the infeed frame 110. The cover 122 may be coupled to the floor 112 by way of rails, tracks, rollers, and/or fasteners. The cover 122 may have a solid section, i.e., with no perforations 124, that is adjacent to one end and a perforated section, which encompasses the perforations 124, that is adjacent to the opposite end. The solid section may encompass at least half or more, such as three-quarters, of the body of the cover 122, and the perforated section may encompass half or less, such as one-quarter, of the body of the cover. However, it should be appreciated that the perforations 124 may be located on the cover 122 at any desired location and may span any desired amount of the body of the cover 122. The cover 122 may have any desired shape and may comprise any desired material.

The perforations 124 may completely extend through the body of the cover 122. The perforations 124 may have any desired size and cross-section, such as circular, oval, rectangular, etc. The perforations 124 may be located on the cover 122 at any desired location and in any desired pattern. For instance, the perforated section of the cover 122 may include at least one row of perforations 124, such as a first and second row of perforations 124.

Each actuating member 126 is connected to and supported by the infeed frame 110 and connected to the cover 122. As shown in FIGS. 1-3, the actuating member 126 is in the form of an actuator 126, such as a hydraulic, electric, or pneumatic cylinder 126, that slides the cover 122 relative to the infeed frame 110. The actuator 126 may also be in the form of a motor coupled with the cover 122. The actuator 126 is connected to the floor 112 and is positioned adjacent to the forward end of the header 100; however, the actuator 126 may be connected to the infeed frame 110 at any desired location and may be connected to any side of the cover 122. It should be appreciated that the header 100 may include one, two, three, or more actuators 124 connected in between the infeed frame 110 and a respective cover 122.

In the present exemplary embodiment, in which the actuating member 126 is a cylinder 126, the agricultural vehicle or header 100 may further include the ECU 130 and accompanying sensor(s) 140, 142 which are operably connected to the actuator 126 in order to automate the movement of the cover 122. Additionally, the operator of the agricultural vehicle may input a command into a user interface so that the electronic control unit 130 may actuate the actuator 126 to slide the cover 122 in between the cleanout, perforated, and closed positions.

The ECU 130 can be operably connected to each actuator 126 and to the sensor(s) 140, 142. The ECU 130 may also include a tangible computer readable medium, e.g. memory 132, for storing software code or instructions. The ECU 130 may be in the form of any desired ECU or controller, and the ECU 130 may be incorporated into existing hardware and/or software of the agricultural vehicle or header 100.

The sensor(s) 140, 142 may be connected to the infeed frame 110 and operably connected to the electronic control unit 130. Each sensor 140, 142 may send a feedback signal to the ECU 130 such that the ECU 130 selectively actuates each actuator 126 responsive to the signal(s) provided by the sensor(s) 140, 142. The at least one sensor 140, 142 can be in the form of an optical sensor 140 or a position sensor 142. As shown, the header 100 includes an optical sensor 140, for sensing the material buildup on the infeed frame 110, as well as a position sensor 142, for sensing the position of the cover 122 and/or actuator 126. The optical sensor 140 can be connected to the infeed frame 110 at any desired location, such as adjacent to one of the lateral ends of the infeed frame 110. The position sensor 142 may be connected to the infeed frame 110, the cover 122, and/or the actuator 126. For example, the position sensor 142 may be integrally formed with the actuator 126. It should be appreciated that the header 100 may only include one of the sensors 140, 142.

Figure 4:
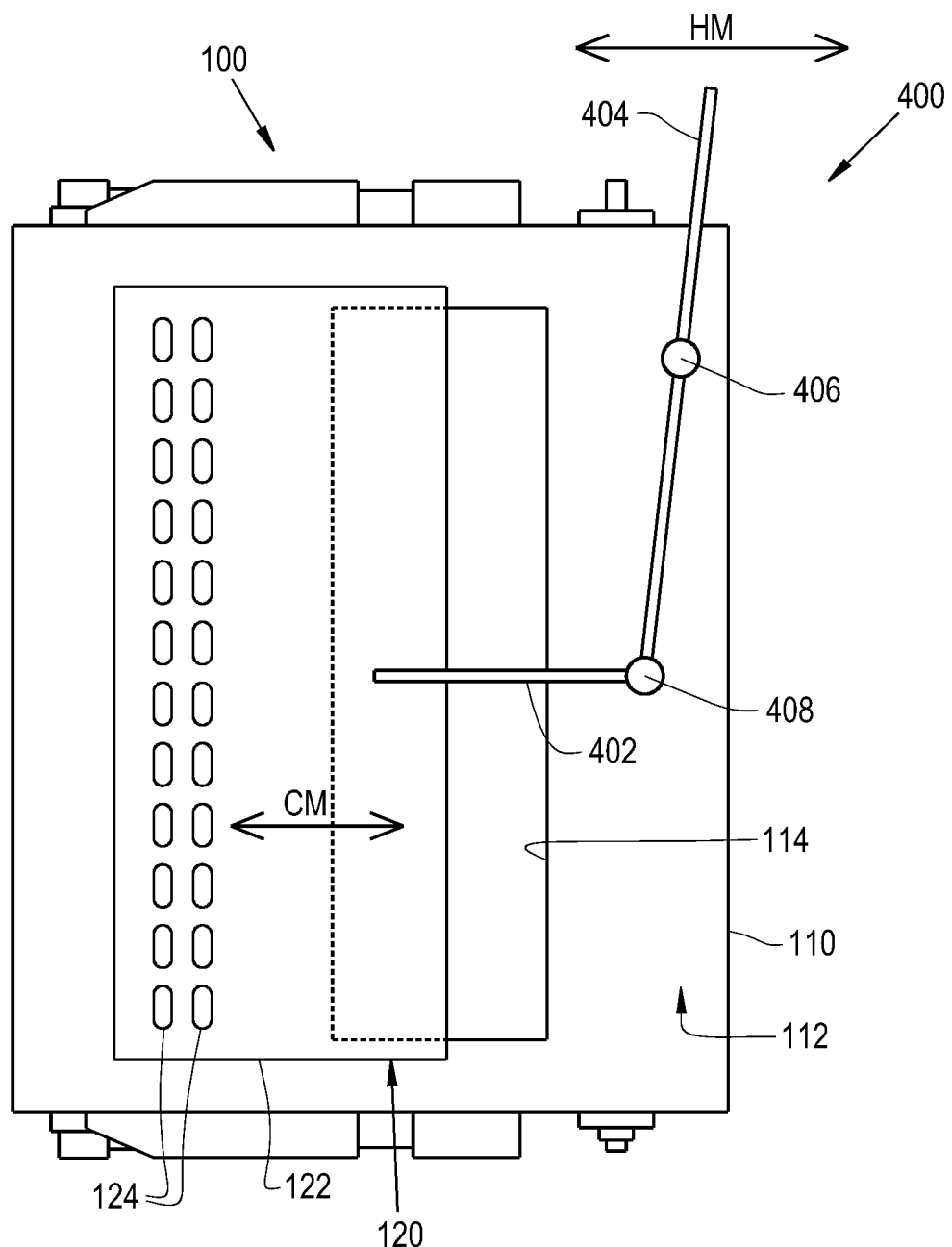
FIG. 4 illustrates a bottom view of another exemplary embodiment of a header having a cover and a horizontal handle, in accordance with an exemplary embodiment of the present invention.

Referring now to FIG. 4, there is shown another exemplary embodiment of the header 100 in which the actuating member 400 includes a linkage 402 and a horizontally disposed handle 404. It should be appreciated that an operator may manually adjust the position of the handle 404 to position the cover 122. For example, the operator may move the end of the handle 404 forwardly and rearwardly, as shown by handle movement arrow HM, to accordingly move the cover 122, as shown by cover movement arrow CM, in between the cleanout, perforated, and closed positions.

The linkage 402 can be attached to the cover 122 and pivotally connected to the handle 404. The linkage 402 may be in the form of a rod. It should be appreciated that the header 100 may include more than one linkage interconnected in between the cover 122 and the handle 404.

The handle 404 can be pivotally connected to the infeed frame 110 at a pivot location 406 and to the linkage at a pivot location 408. The handle 404 may be horizontally disposed so that the handle 404 is substantially parallel with the floor 112 of the infeed frame 110. The handle 404 may be in the form of a rod. The pivot location 406 may include a pivot mount, such as a rotating bracket, which dually mounts the handle 404 and allows the handle 404 to pivot relative to the infeed frame 110.

Figure 5:
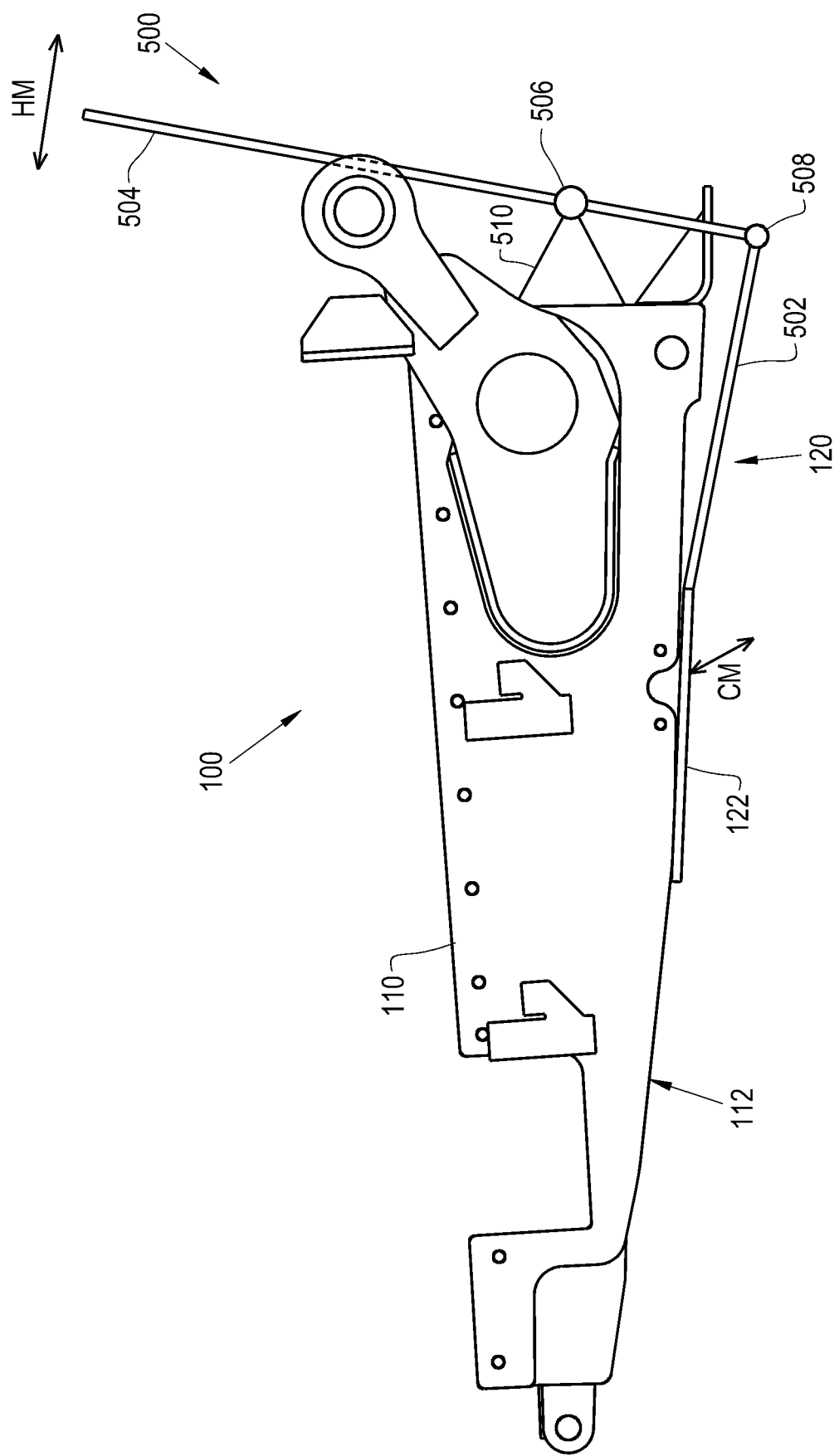
FIG. 5 illustrates a bottom view of another exemplary embodiment of a header having a cover and a vertical handle, in accordance with an exemplary embodiment of the present invention.

Referring now to FIG. 5, there is shown another exemplary embodiment of the header 100 in which the actuating member 500 includes a linkage 502 and a vertically disposed handle 504. It should be appreciated that an operator may manually adjust the position of the handle 504, along arrow HM, to move the cover 122, along arrow CM, so that the cover 122 may be positioned in between the cleanout, perforated, and closed positions. It should be appreciated that the cover 122 may slide approximately horizontally, plus or minus 45 degrees, within a designated track.

The linkage 502 can be fixedly or pivotally attached to the cover 122 and pivotally connected to the handle 504. The linkage 502 may be in the form of a rod, which is positioned underneath the floor 112 of the infeed frame 110. It should be appreciated that the header 100 may include more than one linkage interconnected in between the cover 122 and the handle 504.

The handle 504 can be pivotally connected to the infeed frame 110 at a pivot location 506 and the linkage 502 at a pivot location 508. The handle 504 may be substantially vertically disposed. Hence, the operator may adjust the handle 504 without bending down to a location that is adjacent to the floor 112. The handle 504 may be in the form of a rod. The pivot location 506 may include a pivot mount 510, such as a bracket, which mounts the handle 504 to the rear side of the infeed frame 110.

The header 100 may also include one or more locking members that are associated with and operably connected to the cover 122 and/or the actuating member 126, 400, 500 (not shown). The locking member may prevent the actuator 126 or handle 404, 504 from moving the cover 122. The locking member may be in the form of a locking pin, latch, rod, or fastener.

Figure 6:
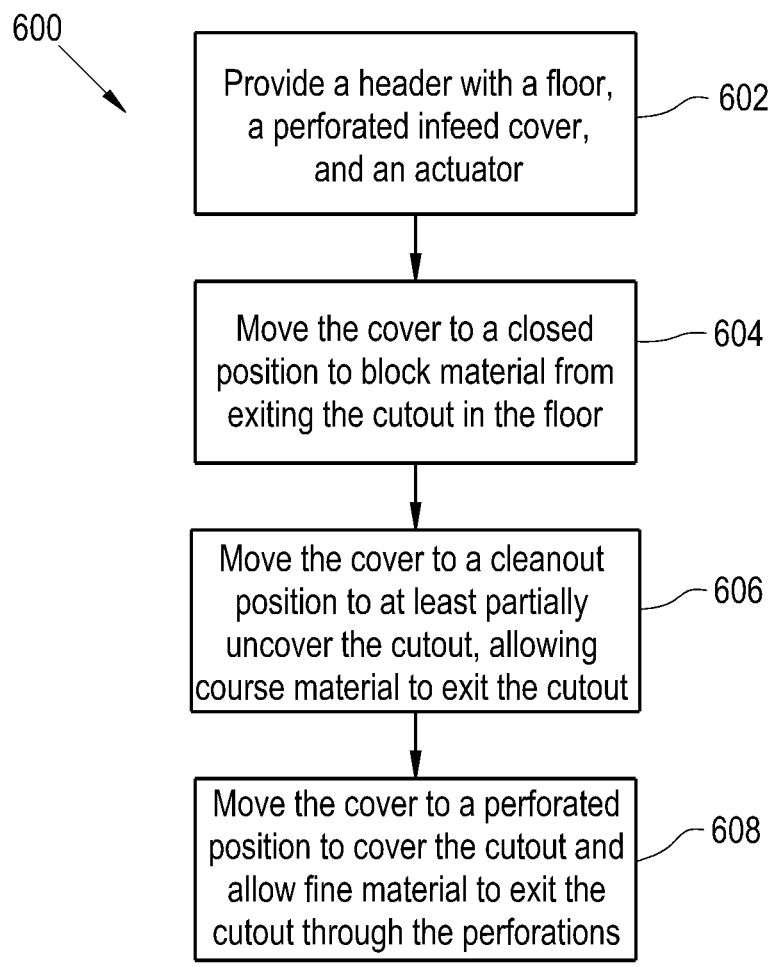
FIG. 6 illustrates a flow diagram of a method of cleaning out the infeed deck of the header, in accordance with an exemplary embodiment of the present invention.

Referring now to FIG. 6, there is shown a flow diagram of a method 600 for cleaning out the infeed deck 112 of the header 100. The method 600 may include an initial step of providing the header 100 having the clean out system 120 with the cover 122 and actuating member 126, 400, or 500, as discussed above (at block 602). Thereby, the cover 122 may be moved by the cylinder 126 via the ECU 130 or the handle 404, 504 via an operator. The cover 122 may be moved into the closed position to block material from exiting the cutout 114 in the floor 112 (at block 604). The cover 122 may be moved into the cleanout position to at least partially uncover the cutout 114 so that material may exit through the cutout 114 (at block 606). The cover 122 may be moved into the perforated position to cover the cutout 114 and align at least one of the perforations 124 underneath the cutout 114 (at block 608). Thereby, in the perforated position, the material may exit the cutout 114 through the at least one perforation 124.

It is to be understood that the steps of the method 600 may be performed by the controller 130 upon loading and executing software code or instructions. The controller 130 may include software code or instructions which are tangibly stored on the tangible computer readable medium 132. The computer readable medium 132 may be in the form of a magnetic medium, e.g., a computer hard drive, an optical medium, e.g., an optical disc, solid-state memory, e.g., flash memory, or other storage media known in the art. Thus, any of the functionality performed by the controller 130 described herein may be implemented in software code or instructions which are tangibly stored on the tangible computer readable medium 132. The controller 130 loads the software code or instructions via a direct interface with the computer readable medium 132 or via a wired and/or wireless network. Upon loading and executing such software code or instructions by the controller 130, the controller 130 may perform any of the functionality described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

The invention claimed is:

1. A clean out system of a header for an agricultural vehicle, the header comprising a frame with a floor having at least one cutout for allowing an unwanted material to pass therethrough, the clean out system comprising:
   at least one cover configured for movably connecting to the floor, the at least one cover terminating at an outer perimeter edge and comprising a perforated section comprising a plurality of perforations located within the outer perimeter edge and a solid section located within the outer perimeter edge; and
   at least one actuating member connected to the at least one cover and configured for moving the at least one cover between a first position in which the solid section of the at least one cover completely overlaps the at least one cutout for blocking the unwanted material from exiting the header, a second position in which no portion of the cover overlaps at least a portion of the at least one cutout for permitting the unwanted material to pass through the at least one cutout, and a third position in which at least one perforation in the perforated section overlaps the at least one cutout for permitting the unwanted material to pass through the at least one cutout and the at least one perforation of the plurality of perforations.

2. The clean out system of claim 1, wherein the at least one cover is slideably connected to the floor of the frame such that the at least one actuating member slides the at least one cover in between the first, second, and third positions.

3. The clean out system of claim 1, wherein the outer perimeter edge comprises a first end and a second end, the solid section is adjacent to the first end, and the perforated section is adjacent to the second end.

4. The clean out system of claim 3, wherein the perforated section comprises at least one row of the plurality of perforations.

5. The clean out system of claim 1, further comprising an electronic control unit operably connected to the at least one actuating member.

6. The clean out system of claim 5, further comprising at least one sensor connected to the frame and operably connected to the electronic control unit, the at least one sensor is configured for sending a signal to the electronic control unit such that the electronic control unit actuates the at least one actuating member in response signal of the at least one sensor.

7. The clean out system of claim 6, wherein the at least one sensor is at least one of an optical sensor and a position sensor.

8. The clean out system of claim 1, wherein the at least one actuating member is in the form of a cylinder configured for sliding the at least one cover relative to the frame.

9. The clean out system of claim 1, wherein the at least one actuating member comprises a linkage connected to the at least one cover and a handle pivotally connected to the frame and the linkage.

10. A header for an agricultural vehicle, comprising:
    a frame comprising a floor with at least one cutout for allowing an unwanted material to pass therethrough; and
    a clean out system connected to the floor of the frame, the clean out system comprising:
       at least one cover movably connected to the floor, the at least one cover terminating at an outer perimeter edge and comprising a perforated section comprising a plurality of perforations located within the outer perimeter edge and a solid section located within the outer perimeter edge; and
       at least one actuating member supported by the frame and connected to the at least one cover and configured for moving the at least one cover between a first position in which the solid section of the at least one cover completely overlaps the at least one cutout for blocking the unwanted material from exiting the header, a second position in which no portion of the cover overlaps at least a portion of the at least one cutout for permitting the unwanted material to pass through the at least one cutout, and a third position in which at least one perforation in the perforated section overlaps the at least one cutout for permitting the unwanted material to pass through the at least one cutout and the at least one perforation of the plurality of perforations.

11. The header of claim 10, wherein the at least one cover is slideably connected to the floor of the frame such that the at least one actuating member slides the at least one cover in between the first, second, and third positions.

12. The header of claim 10, wherein the outer perimeter edge comprises a first end and a second end, the solid section is adjacent to the first end, and the perforated section is adjacent to the second end.

13. The header of claim 12, wherein the perforated section comprises at least one row of the plurality of perforations.

14. The header of claim 10, further comprising an electronic control unit operably connected to the at least one actuating member.

15. The header of claim 14, further comprising at least one sensor connected to the frame and operably connected to the electronic control unit, the at least one sensor is configured for sending a signal to the electronic control unit such that the electronic control unit actuates the at least one actuating member in response signal of the at least one sensor.

16. The header of claim 15, wherein the at least one sensor is at least one of an optical sensor and a position sensor.

17. The header of claim 10, wherein the at least one actuating member is in the form of a cylinder configured for sliding the at least one cover relative to the frame.

18. The header of claim 10, wherein the at least one actuating member comprises a linkage connected to the at least one cover and a handle pivotally connected to the frame and the linkage.

19. A method for cleaning a header for an agricultural vehicle, the header comprising a frame with a floor having at least one cutout for allowing an unwanted material to pass therethrough, comprising:
  providing a clean out system comprising: at least one cover configured for moveably connecting to the floor, the at least one cover terminating at an outer perimeter edge and comprising a perforated section comprising a plurality of perforations located within the outer perimeter edge and a solid section located within the outer perimeter edge; and at least one actuating member connected to the at least one cover and configured for moving the at least one cover;
  moving the at least one cover, by the at least one actuating member, into a first position in which the solid section of the at least one cover completely overlaps the at least one cutout for blocking the unwanted material from exiting the header;
  moving the at least one cover, by the at least one actuating member, into a second position in which no portion of the cover overlaps at least a portion of the at least one cutout for permitting the unwanted material to pass through the at least one cutout; and
  moving the at least one cover, by the at least one actuating member, into a third position in which at least one perforation in the perforated section overlaps the at least one cutout for permitting the unwanted material to pass through the at least one cutout and the at least one perforation of the plurality of perforations.

20. The method of claim 19, wherein the outer perimeter edge comprises a first end and a second end, the solid section is adjacent to the first end, and the perforated section is adjacent to the second end.

* * * * *